(12) United States Patent
Shaik

(10) Patent No.: US 8,023,647 B2
(45) Date of Patent: *Sep. 20, 2011

(54) PASSWORD SELF ENCRYPTION METHOD AND SYSTEM AND ENCRYPTION BY KEYS GENERATED FROM PERSONAL SECRET INFORMATION

(76) Inventor: Cheman Shaik, Riyadh (SA)

(*) Notice: Subject to any disclaimer, the term of this patent is extended or adjusted under 35 U.S.C. 154(b) by 101 days.

This patent is subject to a terminal disclaimer.

(21) Appl. No.: 12/402,913

(22) Filed: Mar. 12, 2009

(65) Prior Publication Data
US 2009/0300362 A1 Dec. 3, 2009

Related U.S. Application Data

(62) Division of application No. 12/170,506, filed on Jul. 10, 2008, now Pat. No. 7,522,723.

(60) Provisional application No. 61/056,991, filed on May 29, 2008.

(51) Int. Cl.
*H04K 1/00* (2006.01)
*H04L 9/00* (2006.01)
*H04L 9/30* (2006.01)

(52) U.S. Cl. .......... 380/30; 380/282; 713/183; 713/184; 726/5

(58) Field of Classification Search .............. 713/176, 713/184, 183; 380/28, 29, 30, 282; 726/5
See application file for complete search history.

(56) References Cited

U.S. PATENT DOCUMENTS

| 4,376,299 A | 3/1983 | Rivest | 705/61 |
|---|---|---|---|
| 4,405,829 A | 9/1983 | Rivest et al. | 380/30 |
| 4,932,056 A | 6/1990 | Shamir | 713/180 |
| 5,144,667 A | 9/1992 | Pogue | 380/45 |
| 5,241,599 A | 8/1993 | Bellovin et al. | 380/21 |
| 5,606,617 A | 2/1997 | Brands et al. | 380/30 |
| 5,666,414 A | 9/1997 | Micali | 380/21 |
| 5,724,428 A | 3/1998 | Rivest | 380/37 |
| 5,796,833 A | 8/1998 | Chen et al. | 380/25 |
| 5,835,600 A | 11/1998 | Rivest | 380/44 |
| 5,953,424 A | 9/1999 | Vogelesang et al. | 380/25 |
| 5,956,407 A | 9/1999 | Slavin et al. | 380/30 |
| 5,987,129 A | 11/1999 | Baba | 380/279 |
| 5,991,415 A | 11/1999 | Shamir | 380/30 |
| 6,041,122 A | 3/2000 | Graunke | 713/168 |

(Continued)

FOREIGN PATENT DOCUMENTS

DE 003540173 A1 5/1987

(Continued)

OTHER PUBLICATIONS

Perlman et al., Secure Password-based protocol for downloading a private key, 1999.*

(Continued)

*Primary Examiner* — David Garcia Cervetti
(74) *Attorney, Agent, or Firm* — Walter J. Tencza, Jr.

(57) ABSTRACT

A public key cryptographic system and method is provided for a password or any other predefined personal secret information that defeats key factoring and spoofing attacks. The method adopts a new technique of encrypting a password or any predefined secret information by a numeric function of itself, replacing the fixed public key of the conventional RSA encryption. The whole process involving key generation, encryption, decryption and password handling is discussed in detail. Mathematical and cryptanalytical proofs of defeating factoring and spoofing attacks are furnished.

19 Claims, 4 Drawing Sheets

U.S. PATENT DOCUMENTS

| | | | | |
|---|---|---|---|---|
| 6,061,791 | A | 5/2000 | Moreau | 713/171 |
| 6,088,800 | A | 7/2000 | Jones | 713/189 |
| 6,151,676 | A | 11/2000 | Cuccia | 713/176 |
| 6,189,096 | B1 | 2/2001 | Haverty | 713/155 |
| 6,226,383 | B1* | 5/2001 | Jablon | 380/30 |
| 6,269,163 | B1 | 7/2001 | Rivest | 380/28 |
| 6,360,324 | B2 | 3/2002 | VanBlarkom | 713/182 |
| 6,411,715 | B1 | 6/2002 | Liskov et al. | 380/277 |
| 6,694,025 | B1 | 2/2004 | Epstein | 380/279 |
| 6,751,735 | B1 | 6/2004 | Schell et al. | 713/189 |
| 6,757,825 | B1 | 6/2004 | MacKenzie et al. | 713/169 |
| 6,769,060 | B1 | 7/2004 | Dent | 713/168 |
| 6,823,453 | B1 | 11/2004 | Hagerman et al. | 713/162 |
| 6,829,356 | B1* | 12/2004 | Ford | 380/44 |
| 6,938,156 | B2 | 8/2005 | Wheeler | 713/170 |
| 6,965,992 | B1 | 11/2005 | Joseph et al. | 713/153 |
| 6,973,568 | B2 | 12/2005 | Hagerman | 713/153 |
| 6,985,583 | B1 | 1/2006 | Brainard | 380/44 |
| 7,017,181 | B2 | 3/2006 | Spies et al. | 726/3 |
| 7,047,408 | B1 | 5/2006 | Boyko et al. | 713/169 |
| 7,058,180 | B2* | 6/2006 | Ferchichi et al. | 380/247 |
| 7,073,068 | B2* | 7/2006 | Jakobsson et al. | 713/184 |
| 7,076,656 | B2 | 7/2006 | MacKenzie | 713/171 |
| 7,083,089 | B2* | 8/2006 | Hopkins | 235/382 |
| 7,088,821 | B2* | 8/2006 | Shaik | 380/30 |
| 7,139,917 | B2* | 11/2006 | Jablon | 713/183 |
| 7,143,284 | B2 | 11/2006 | Wheeler | 713/155 |
| 7,149,311 | B2 | 12/2006 | MacKenzie et al. | 380/286 |
| 7,191,340 | B2* | 3/2007 | Wuidart et al. | 713/189 |
| 7,269,256 | B2 | 9/2007 | Rosen | 380/44 |
| 7,284,127 | B2 | 10/2007 | Gehrmann | 713/169 |
| 7,346,162 | B2 | 3/2008 | Slavin | 380/30 |
| 7,359,507 | B2* | 4/2008 | Kaliski | 380/30 |
| 7,363,494 | B2 | 4/2008 | Brainard | 713/168 |
| 7,366,299 | B2 | 4/2008 | Cheung | 380/28 |
| 7,424,615 | B1* | 9/2008 | Jalbert et al. | 713/171 |
| 7,522,723 | B1* | 4/2009 | Shaik | 380/30 |
| 7,646,872 | B2* | 1/2010 | Brown et al. | 380/277 |
| 7,698,555 | B2* | 4/2010 | Jiang et al. | 713/168 |
| 7,764,795 | B2* | 7/2010 | Philips | 380/284 |
| 2001/0055388 | A1* | 12/2001 | Kaliski, Jr. | 380/30 |
| 2002/0025035 | A1 | 2/2002 | Rivest | 380/42 |
| 2002/0041684 | A1 | 4/2002 | Nishioka | 380/30 |
| 2002/0067832 | A1* | 6/2002 | Jablon | 380/277 |
| 2003/0037237 | A1* | 2/2003 | Abgrall et al. | 713/166 |
| 2003/0105980 | A1 | 6/2003 | Challener et al. | 713/202 |
| 2003/0204732 | A1 | 10/2003 | Audebert | 713/182 |
| 2003/0229788 | A1* | 12/2003 | Jakobsson et al. | 713/171 |
| 2004/0005061 | A1 | 1/2004 | Buer et al. | 380/282 |
| 2004/0039924 | A1* | 2/2004 | Baldwin et al. | 713/189 |
| 2004/0073795 | A1* | 4/2004 | Jablon | 713/171 |
| 2004/0101142 | A1 | 5/2004 | Nasypny | 380/278 |
| 2004/0234074 | A1 | 11/2004 | Sprunk | 380/28 |
| 2004/0236942 | A1 | 11/2004 | Kim | 713/156 |
| 2005/0010751 | A1 | 1/2005 | Nahlinder | 713/150 |
| 2005/0010801 | A1* | 1/2005 | Spies et al. | 713/200 |
| 2005/0105719 | A1 | 5/2005 | Hada | 380/28 |
| 2005/0166263 | A1 | 7/2005 | Nanopoulos | 726/7 |
| 2005/0232428 | A1* | 10/2005 | Little et al. | 380/277 |
| 2005/0251680 | A1* | 11/2005 | Brown et al. | 713/171 |
| 2006/0041759 | A1* | 2/2006 | Kaliski et al. | 713/184 |
| 2006/0083370 | A1 | 4/2006 | Hwang | 380/28 |
| 2006/0229991 | A1 | 10/2006 | Campagna | 705/50 |
| 2006/0256961 | A1 | 11/2006 | Brainard | 380/44 |
| 2006/0271789 | A1* | 11/2006 | Satomura et al. | 713/183 |
| 2006/0280300 | A1 | 12/2006 | Rossini | 380/44 |
| 2006/0291661 | A1 | 12/2006 | Ramzan et al. | 380/277 |
| 2007/0016796 | A1 | 1/2007 | Singhal | 713/183 |
| 2007/0177731 | A1* | 8/2007 | Spies et al. | 380/47 |
| 2007/0180230 | A1* | 8/2007 | Cortez | 713/156 |
| 2007/0288753 | A1 | 12/2007 | Gehrmann | 713/171 |
| 2007/0294538 | A1 | 12/2007 | Lim | 713/183 |
| 2008/0008316 | A1 | 1/2008 | Pilipchuk | 380/45 |
| 2008/0016347 | A1 | 1/2008 | Maj | 713/168 |
| 2008/0082817 | A1* | 4/2008 | Takahashi et al. | 713/155 |
| 2008/0120504 | A1* | 5/2008 | Kirkup et al. | 713/176 |
| 2008/0148047 | A1* | 6/2008 | Appenzeller et al. | 713/162 |
| 2008/0250248 | A1 | 10/2008 | Lieber | 713/183 |
| 2008/0317247 | A1* | 12/2008 | Jeong et al. | 380/44 |
| 2009/0240944 | A1* | 9/2009 | Cho et al. | 713/175 |
| 2009/0307496 | A1* | 12/2009 | Hahn et al. | 713/171 |
| 2010/0017593 | A1* | 1/2010 | Putz | 713/150 |
| 2010/0104102 | A1* | 4/2010 | Brown et al. | 380/277 |
| 2011/0091036 | A1* | 4/2011 | Norrman et al. | 380/44 |
| 2011/0145575 | A1* | 6/2011 | Blommaert et al. | 713/168 |

FOREIGN PATENT DOCUMENTS

| | | | |
|---|---|---|---|
| EP | 0848315 | A3 | 6/1999 |
| EP | 1737156 | A2 | 12/2006 |
| EP | 1855414 | A1 | 11/2007 |
| JP | 401119143 | A | 5/1989 |
| JP | 401119144 | A | 5/1989 |
| WO | WO2004040410 | A2 | 5/2004 |

OTHER PUBLICATIONS

David Jablon, Strong password-only authenticated key exchange, ACM, 1996.*

"Foiling the Cracker": A Survey of, and Improvements to, Password Security; Daniel V. Klein, Carnegie Mellon Institute Pittsburgh PA; pp. 1-11.

"Augmented encrypted key exchange: a password-based protocol secure against dictionary attacks and password file compromise", Conference on Computer and Communications Security, Author-Steven M. Belloven and Michael Merritt, Year of Publication—1993, pp. 244-250.

"Public-key cryptography and password protocols", ACM Transactions on Information and System Security (TISSEC), Publication 1999, pp. 230-268.

"Password Authentication with insecure communication", Communications of the ACM, vol. 24, Issue 11, Author—Leslie Lamport, SRI International, Menlo Park, CA, Published 1981, pp. 770-772.

"Strong Password-only authenticated key exchange", ACM SIGCOMM Computer Communication Review. vol. 26, Issue 5 Author—David P. Jablon, Integrity Sciences, Inc. Westboro, MA, Published 1996, pp. 5-26.

"Secure Password-Based Protocol for Downloading a Private Key", Perlman, Sun Microsystems Laboratories, and Kaufman, Iris Associates.

"The Secure Remote Password Protocol", Thomas Wu, Computer Science Department, Stanford University.

"Encrypted key exchange: password-based protocols secure against dictionary attacks", Research in Security and Privacy, 1992, Proceedings., pp. 72-84, Publication Date: May 1992.

"Reducing Risks from poorly chosen keys," ACM SIGOPS Operating Systems Review, 1989, pp. 14-18.

A Web-only Primer on Public-key Encryption. http://www.theatlantic.com/doc/200209/mann_g.

Public-Key Cryptography,.http://cam.qubit.org/articles/crypto/publickey.php.

Modular Mathematics, RSA Cryptography. http://mathreference.com/nummod.rsa.html.

The Pure Crypto Project. Remarks on Security.http://senderek.com/pcp/pcp-security.html.

Easy Fast Efficient Certification Technique. http://pdos.esail.mit.edu/asrg/2000-10-30.ppt.

RSA. http://em/wikipedia.org/wiki/RSA.

* cited by examiner

PASSWORD SELF ENCRYPTION METHOD AND SYSTEM AND ENCRYPTION BY KEYS GENERATED FROM PERSONAL SECRET INFORMATION

CROSS REFERENCE TO RELATED APPLICATION(S)

The present application claims the priority of U.S. provisional patent application Ser. No. 61/056,991, filed on May 29, 2008 inventor and applicant Cheman Shaik; and the present application is a divisional of and claims the priority of U.S. patent application Ser. No. 12/170,506, filed on Jul. 10, 2008, which issued as U.S. Pat. No. 7,522,723, issued on Apr. 21, 2009, inventor and applicant Cheman Shaik.

FIELD OF THE INVENTION

This invention relates to cryptographic systems, computers, and computer-implemented methods for performing encryption and decryption operations.

BACKGROUND OF THE INVENTION

Password encryption is a paramount requirement to control access to web applications and protect confidential information. A password in clear text is vulnerable to interception and eavesdropping on the Internet, which may result in significant information and financial loss to its owner. Public key encryption algorithms that are in use today provide computationally unbreakable encryption to passwords, as discussed in "A Web-only Primer on Public-key Encryption". Though these algorithms are perceived to be unbreakable with today's possible computational speeds, there lies no guarantee that the same situation will continue in future, taken into consideration various factors such as the level of currently ongoing academic research to break these algorithms, continuously increasing processing power of computers, and the application of parallel processing techniques and quantum computers to factorize large numbers (see "Public-Key Cryptography", and Nielsen, Michael A. and Chuang, Isaac L., "Quantum Computation and Quantum Information", Cambridge University Press, Cambridge, 2000).

None of the proven public key cryptosystems as of today provide absolute security, that is, never-breakable security. The most well known and widely implemented public key cryptosystem for information security is the RSA algorithm, whose security lies in the difficulty of factoring the key modulus into its primes (see "Modular Mathematics", RSA cryptography. "RSA" stands for the surnames of Ron Rivest, Adi Shamir, and Leonard Adelman, who publicly described the RSA algorithm or method in 1977. If someone invents in the future a trivial factoring technique for large numbers, it will mark the end of the RSA cryptosystem, resulting in a drastic impact on e-commerce and e-banking activities.

Further, public key cryptosystems are vulnerable to spoofing attacks (see "The Pure Crypto Project", Remarks on Security, which can be easily crafted by a man-in-the-middle. A spoofed public key can render an otherwise secure communication insecure (see "Easy Fast Efficient Certification Technique). These attacks are not computationally intensive in nature unlike factoring attacks. Spoofing attacks can be mounted in real time without requiring any sophisticated computing infrastructure. Though web browsers verify the authenticity of public keys and provide alerts to users on mismatching keys, most users are unaware of the subject matter and technically not sound enough to understand the seriousness of the problem and be vigilant to notice spoofing attacks.

Research was done in the past to devise public key cryptographic techniques that survive private key compromise attacks (see Cheman Shaik, "Robust Public Key Cryptography—a New Crypto System Surviving Private Key Compromise. Proceedings of the Second European Conference on Computer Network Defense). However, more research needs to be done in the direction of developing new password encryption techniques that withstand factoring and key spoofing attacks.

SUMMARY OF THE INVENTION

One or more embodiments of the present invention relate to a cryptographic system, method, and/or apparatus that survives spoofing and factoring attacks on encryption keys used to encrypt password or any other predefined personal secret information. One or more embodiments also enable implementation of digital certificates for customers without issuing large unmemorable numeric keys for achieving non-repudiation. Further, dependency on certifying authorities for confirming authenticity of keys is eliminated. Another great advantage, for one or more embodiments of the present invention is that RSA encryption can be continued for encrypting passwords of existing users of a web application even after the cryptosystem is broken in the future by any trivial factorization technique for large numbers.

A process for generating a key or keys in accordance with an embodiment of the present invention may be as follows:
  (a) A server computer may select a defined password of a user from a web application's user table stored in a computer server database.
  (b) The server computer may convert the password to an integer x using any text-to-number conversion scheme.
  (c) The server computer may compute a public key exponent $e=f(x)$ where $f(x)$ is any function of x that results in an odd integer for e.
  (d) The server computer may select a prime number p such that $p-1$ and e are relative primes.
  (e) The server computer may select another prime number q such that $q-1$ and e are relative primes.
  (f) The server computer may compute Euler Totient Function $\phi=(p-1)(q-1)$.
  (g) The server computer may compute a private key exponent d such that $e \cdot d = k\phi + 1$.
  (h) The server computer may compute the key modulus $n=pq$.
  (i) The server computer may discard x, e, p, q and $\phi$ to garbage, leaving no record thereof, such as by permanently deleting the variables.
  (j) The server computer may store d and n in a user table against the password.

A process for generating a private key exponent d in accordance with an embodiment of the present invention requires that a public key exponent e be selected first, and then two suitable primes p and q be selected as described in the steps c, d and e above. This is procedurally different from the conventional RSA keys generation method in which primes p and q are selected first, and then suitable e is selected to achieve shorter computation time.

A process for encrypting password in accordance with an embodiment of the present invention may be as follows:
  (a) A user at a user or client computer may enter his userid and password in an authentication web page.

(b) The user may submit only a userid (user identification) from the client computer to the server computer while retaining the password in the web page.
(c) The server computer may receive the userid, retrieve the RSA key modulus n for that particular userid from a user table stored in server database and may pass it to the user's web page.
(d) The user or client computer converts his password to the same integer x as done on the server computer using the same text-to-number conversion scheme used by the server computer.
(e) The user or client computer computes his public key exponent e=f(x) where f(x) is the same function of x used on the server computer that results in an odd integer for e.
(f) The user or client computer performs randomized padding of the password and converts the resulting text to a number $x_p$ using any text-to-number conversion scheme.
(g) The user or client computer computes password cipher $C=x_p^e \mod n$.
(h) The user or client computer submits both userid and password cipher to the server computer.

In the present application, the terms user computer and client computer are used interchangeably.

A process for decryption in accordance with an embodiment of the present invention may be as follows:
(a) The server computer may capture the userid and password cipher received at the server computer from the client computer.
(b) The server computer may retrieve d and n from a user table stored in its database for the received userid.
(c) The server computer may decrypt the password cipher C into $x_p$ as follows:

$x_p = C^d \mod n$.

(d) The server computer may convert $x_p$ back to the padded text password by reverse conversion.
(e) The server computer may remove padding and extract the original text password.

DETAILED DESCRIPTION OF THE DRAWINGS

Figure 1:
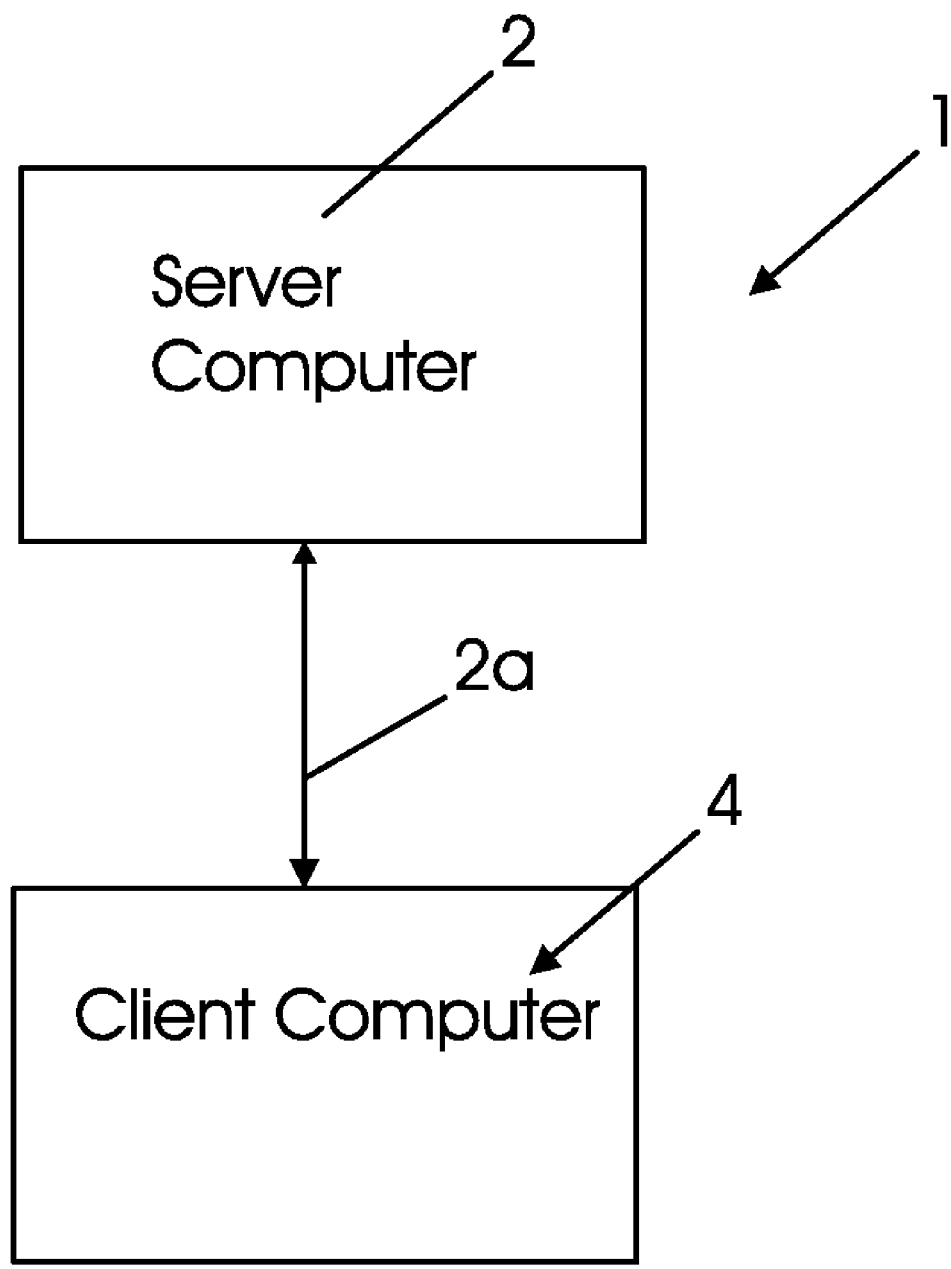
FIG. 1 shows a block diagram of an apparatus for use with an embodiment of the present invention.

FIG. 1 shows a block diagram of an apparatus 1 for use with an embodiment of the present invention. The apparatus 1 includes a server computer 2 and a client computer 4. The server computer 2 and the client computer 4 are connected by a communications link 2a.

Figure 2:
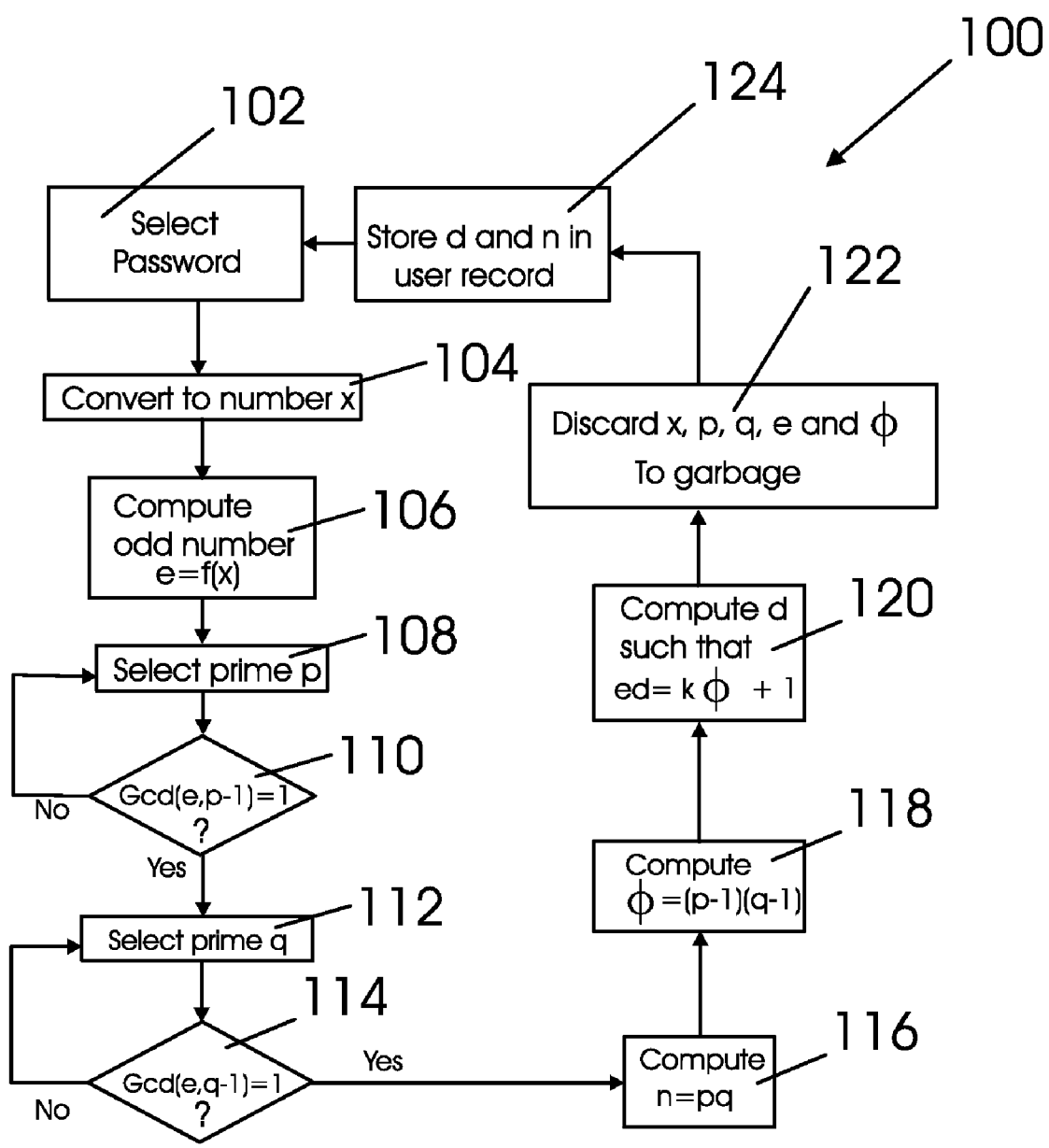
FIG. 2 shows a block diagram of a cryptographic process for use with the apparatus of FIG. 1, in accordance with an embodiment of the present invention.

FIG. 2 shows a block diagram 100 of a cryptographic process for use with the apparatus 1 of FIG. 1, in accordance with an embodiment of the present invention. The process shown by diagram 100 can be executed by a computer program running on the server computer 2. The process of diagram 100, begins at step 102, at which the server computer 2 selects a defined password of a user from a web application's user table which is located in database or flat file of the server computer 2. The server computer 2 next converts the password into an integer number x at step 104. The conversion of a password to a number may be done in various ways by the server computer 2. For example, the server computer 2 may use a conversion scheme like 01 for a, 02 for b, ... 26 for z, 27 for A, ... 52 for Z, 53 for the number 1, 54 for number 2, ... and so on. But there is no hard and fast rule for this scheme. Every server computer, such as server computer 2, may use its own conversion scheme, but a computer programmer should ensure that the same password conversion scheme is used on both the server computer 2 side and client computer 4 side. Another point note-worthy here is that this conversion scheme need not be kept secret. It can be even publicly revealed. It does not affect the security of encryption. Also, in a public key cryptosystem, even the encryption and decryption process and formula can be completely revealed. The only thing that needs to be kept confidential is the private key. The actual security of RSA encryption lies in the difficulty of factoring the key modulus.

The server computer 2 next computes an odd public key exponent e=f(x) where f(x) is any function of x that results in an odd integer for e, at step 106. The server computer 2 next selects a prime number p at step 108. At step 110 it is determined if the greatest common divisor between e and p−1 is 1 to ensure that e and p−1 are relative primes. If not then a different prime number is selected for p, for an otherwise repeated step 108. Step 110 is then repeated. This continues until the greatest common divisor of e and p−1 is equal to 1.

At step 112 the server computer 2 selects a prime number q. At step 114 it is determined if the greatest common divisor between e and q−1 is equal to 1. If the answer is no then another prime number q is selected and step 114 is repeated. If the answer is yes then the key modulus n=pq, i.e. p times q, is determined by the server computer 2. At step 118 the server computer 2 computes the Euler Totient Function φ=(p−1)(q−1). At step 120, the server computer 2 determines the private key exponent d such that ed=kφ+1 using Euclid's algorithm.

At step 122, x, p, q, e and φ are discarded by server computer 2, leaving no record thereof. At step 124 d and n are stored in a user table record in database of server computer 2 with a specific d and n for a specific password. In one embodiment of the present invention, the same process is followed for every password.

Figure 3:
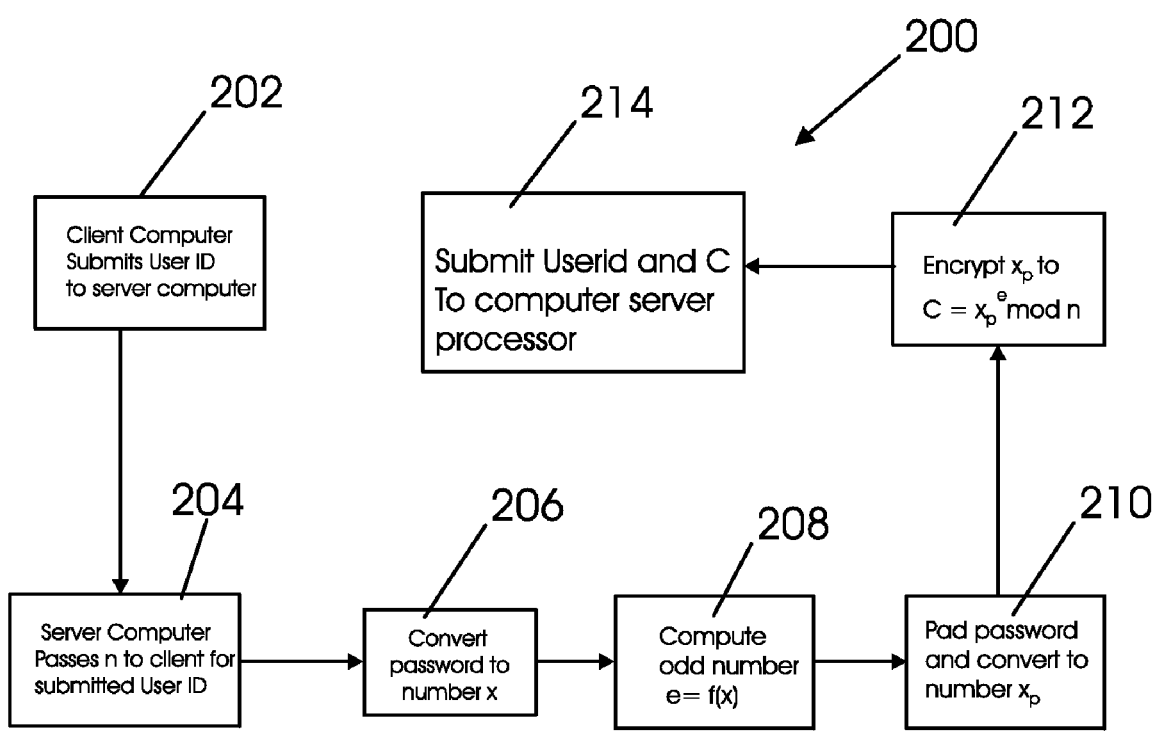
FIG. 3 shows a block diagram of a user identification and password handling method for use with the apparatus of FIG. 1 in accordance with an embodiment of the present invention.

FIG. 3 shows a block diagram 200 of a user identification and password handling method for use with the apparatus of FIG. 1 in accordance with an embodiment of the present invention. At step 202 a user enters his or her user identification (ID) and password in an authentication web page on a client computer 4. The user submits the user identification (ID) from the client computer 4 to the server computer 2. In accordance with an embodiment of the present invention the user submits only the user identification while retaining the password in the web page on the client computer 4, though both values are entered. The server computer 2 receives the user identification from the client computer 4 and retrieves the RSA key modulus n from database or flat file of the server computer 2 for that particular user identification and passes it to the user's web page on the client computer 4, at step 204.

At step 206, the client computer 4 converts the user's password to the same integer x as done on the server computer. At step 208, the client computer 4 computes the user's odd public key exponent e=f(x) where f(x) is the same function used on the server computer 2. For example, in a typical hotmail scenario, a hotmail user enters his user id and password in the hotmail login page for opening his mail box.

Unlike the conventional hotmail page which submits both user id and password at a time to the hotmail server, this encryption applied in hotmail login page submits only the user id (or login id) to the hotmail server when a user clicks ok button, though he enters both user id and password. The password is still retained in the hotmail login page on the user's laptop or personal computer. Subsequently, for the received user id, the hotmail server retrieves the user's key modulus n and returns it to the user's login page. The program logic in the hotmail login page on the client laptop or pc encrypts the retained password with this key modulus n and the public key exponent e calculated in the login page itself on the user's pc or laptop, because e is a function of password itself.

At step 210, the client computer 4 performs randomized padding of the password and converts it to a number $x_p$. At step 212 the client computer 4 computes password cipher $C=x_p^e \mod n$ which is an encryption of $x_p$. At step 214 the client computer 4 submits both the user id and the password cipher, C, to the server computer 2. Generally, a cipher means a resulting scrambled text after encryption.

This special functionality of submitting user id alone from the client computer, requesting the key modulus from the server computer, and encrypting with it the password can be achieved through computer programming with advanced AJAX (Asynchronous Java Script) techniques using JavaScript, DHTML (dynamic hypertext markup language) and hidden HTML (hypertext markup language) frames. Alternatively, user id and password may be entered in two different successive web pages. When the first web page is submitted with user id, the server computer 2 sends a web page containing the key modulus n of the user with a text box for entering password.

An RSA based password encryption method or one or more embodiments of the present invention, protects passwords from both key breaking and spoofing attacks. In at least one embodiment, every password of a web application, such as run by the server computer 2 is converted to an RSA public key exponent through a numerical transformation and mathematical computation at steps 104 and 106 of FIG. 2 respectively. The same procedure is followed by the user at the client computer 4 at steps 206 and 208 of FIG. 3 to transform password into a number and compute the public key exponent. Deviating from the conventional RSA key generation process, which starts with selecting two primes p and q, the server computer 2 in accordance with an embodiment of the present invention is programmed to first compute the public key exponent e at step 106 of FIG. 2 as a function of the password itself. Subsequently, the server computer 2 is programmed to select two primes p and q such that both p−1 and q−1 are relatively primes to the public key exponent. Finally, the decryption exponent d is computed by the server computer 2 at step 120 of FIG. 2 satisfying the governing RSA keys generation eqn. e d=kϕ+1, where k is an integer and ϕ is the Euler Totient Function, which is equal to (p−1)(q−1) (regarding general RSA key generation see R. Rivesi, A. Shamir, and L. Adleman "A method of obtaining digital signature and public key cryptosystems, Communications of the ACM, 21: 121-126, 1978).

Figure 4:
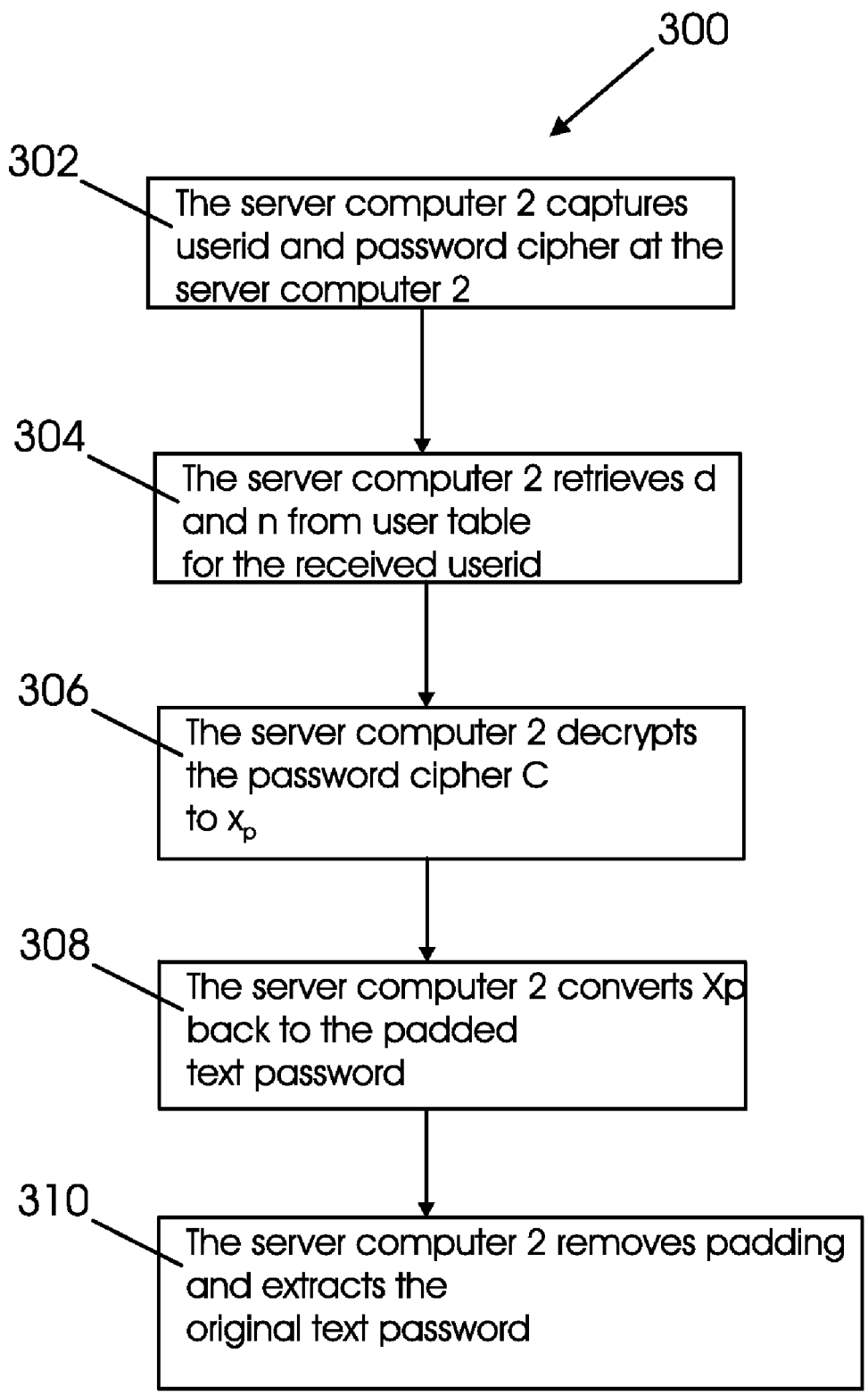
FIG. 4 shows a flow chart of a decryption method in accordance with an embodiment of the present invention.

FIG. 4 shows a flow chart 300 for a decryption method to be performed by the server computer 2 of FIG. 1. At step 302, the server computer 2 captures the userid and password cipher submitted from a client computer 4. At step 304 the server computer 2 retrieves d and n from a user table in database or flat file of the server computer 2 for the received user id. At step 306 the server computer 2 decrypts the password cipher C to $x_p$ as follows: $x_p = C^d \mod n$. At step 308, the server computer 2 converts $x_p$ back to the padded text password. The server computer 2 removes padding and extracts the original text password at step 310. While converting $x_p$ back to the padded text password, reverse conversion should be done appropriately. For example, if 'a' in the padded text password is converted to '01' in $x_p$, then '01' in $x_p$ should be reversed to 'a' in the padded text password.

In the following paragraphs, the security strength of the encryption against factoring and spoofing attacks is analyzed and justified with supporting mathematical and logical arguments.

The following deals with factoring attacks. In case an attacker becomes successful in factoring the key modulus n into two primes p and q, he will be in a position to trivially compute the Euler Totient Function ϕ. Consequently, if the public key exponent e is known, as is the case with conventional RSA encryption, the private key exponent d can be computed by running Euclid's algorithm on e and ϕ. However, in this case e is not revealed to the public as it is not passed from server computer 2 to the client or user computer 4. Advantageously, it is designed as a function of the password itself and recomputed on the client computer 4. Hence, the attacker needs to sift through the entire password space attempting exhaustive brute-force attacks.

The aforementioned strength of the password self encryption method will keep web based authentication and online e-commerce transactions safe from threats in the future even if RSA cryptosystem is broken by inventing any real-time/trivial factorization techniques. Authentication by existing users can still be trusted and continued, although new users can not be accepted.

The following deals with Key Spoofing Attacks. Key spoofing is replacing of an original public key with a fraudulent public key by an attacker during its transmission from a server computer, such as computer 2, to a client computer, such as 4. Unaware of the attack, the victim encrypts his password with a fraudulent public key and submits it to the server computer, such as computer 2. The submitted password cipher is intercepted in the middle and decrypted with the pairing fraudulent private key already known to the attacker.

Password self encryption, in accordance with one or more embodiments of the present invention, defeats spoofing attacks due to the elimination of open public key exponents. The only accessible part of the public key for an attacker is the key modulus n, which could be the target for spoofing. The targeted user encrypts his password as follows with the new modulus $n_s$ introduced by the attacker replacing the original modulus n, and the public key exponent e derived from the password itself:

$$C_s = x_p^e \mod n_s$$

When the attacker intercepts the spoof-encrypted cipher, he decrypts the same as follows:

$$X_{p\text{-}spoof} = C_s^{d_s} \mod n_s$$

In order to achieve the equality $x_{p\text{-}spoof} = x_p$ the attacker's private key exponent $d_s$ must satisfy the governing key generation equation e $d_s = k\phi_s + 1$, where $p_s$ and $q_s$ are prime factors of $n_s$, and $\phi_s = (p_s-1)(q_s-1)$. However, as the actual public key exponent e used for encryption is not revealed to the public, the attacker will not be in a position to compute the exactly matching $d_s$ that can successfully decrypt the cipher, thereby defeating spoofing attacks.

Password self encryption in accordance with one or more embodiments of the present invention, defeats spoofing attacks by eliminating open public key exponent and passing only key modulus from server for encryption. Further, web applications can continue authentication of existing users even if RSA cryptosystem is broken in future.

Password Self Encryption in accordance with one or more embodiments of the present invention is applicable to already defined passwords of existing users of web applications. However, when a new user registers himself with an application defining his login credentials, an explicitly defined public key exponent is required as no private key exponent readily exists on the server for decryption.

In case of existing users, a batch program may be run to generate private key exponent d and modulus n for all users from the existing passwords in the user table. Usually, authentication credentials are defined once in their life cycle and continue to be used several times before they expire or are redefined. As web based applications rarely mandate periodical password changes, it is highly beneficial to use password self encryption for registered users while continuing explicit public key encryption for new users. Since every user is assigned a separate key pair, cracking a particular user's key does not compromise the security of other users, thereby providing good resilience to web applications against attacks.

Dependency on certified keys for trust is eliminated for authentication of registered users as encryption by false public key modulus results in unsuccessful decryption.

As the public key exponent is kept confidential to its respective user, post-login traffic is secure in both directions, client to server and vice versa.

Both message integrity and non-repudiation can be achieved with the dual utility of password as a public key and a private credential unique to a user. The same public key exponent can be used for encrypting a hash value (message digest) and also digitally signing messages. A message digest (hash value) may be generated by a user at a client computer by running any standard cryptographic hash function on a plain message to be encrypted. The generated message digest may be encrypted by the public key derived from the password and appended to the message cipher. When both message cipher and message digest cipher are received at the server computer, the message cipher is decrypted first using the private key, and then the same hash function is run on the resulting plain message to obtain the message digest. Further, the message digest cipher is also decrypted using the private key. The message digests obtained both ways are compared for equality, which confirms message integrity. Any inequality indicates tampering of message on its way to the server computer. The equality of message digests also establishes non-repudiation, which proves that the message sender is definitely the password holder and the action can not be repudiated.

Passwords are widely used low-grade secrets that are typically not-so-random and relatively small, and introduce risks of chosen-ciphertext attacks when inappropriately used as cryptographic keys. In this case randomized password padding before encryption thwarts chosen-ciphertext attacks (see RSA, http://en.wikipedia.org/wiki/RSA).

The number of web application users is ever-increasing due to the growing dependency of people on the Internet for communication, consequently resulting into password duplications among users. However, this is not an issue for implementing a password self encryption technique, in accordance with an embodiment of the present invention. While the same password of two different users results into the same public key exponent, the private key exponent and modulus are chosen to be different.

It is possible to use password as a public key in encryption, eliminating the need for explicitly defined and certified public keys. The benefit that this technique imparts to password security is two-fold; while on one hand it defeats factoring attacks on RSA in future, on the other hand it foils the present-day key spoofing attacks.

Using password self encryption in accordance with embodiments of the present invention in conjunction with the existing conventional public key encryptions such as RSA and ECC offers significant security improvements to web authentications.

Message integrity and non-repudiation can be established without separate digital certificates. Post-login two-way communication security can be achieved with the password-cum-public key approach to encryption.

Web applications can be strengthened to be more resilient to attacks by vesting more security in every user login independently, unlike security through a single key pair for the entire user base.

The encryption technique can be implemented in web browsers such as Internet Explorer and Netscape Navigator or at application level.

The concept and method of using a function of the password or any predefined personal secret information as part or whole of the public key may be applied not only to RSA cryptosystem, but also to other public as well as private key cryptosystems.

Also, a public key can be generated not only from a password, but also from any predefined personal secret information such as a credit card number, a driving license number, social security number etc.

Further, the method of encryption can be used to encrypt not only predefined information but also undefined information such as email. Once a user logs into his email application with his password, his email can be encrypted with the key generated from a copy of the password retained on client computer 4.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising:
    submitting a user identification for a user from a user computer to a server computer;
    receiving a set of information at the user computer from the server computer, in response to the submission of the user identification for the user;
    wherein the set of information includes a parameter of a key; and
    further comprising
    using the user computer to convert user confidential information to a number x, wherein the number x is dependent on the user confidential information;
    using the user computer to compute a number e which is a function of x and which is a function of the user confidential information;
    using the user computer to pad the number x to convert x to $x_p$;
    using the user computer to encrypt $x_p$ by using the parameter of the key and the number e to form a cipher C, wherein C is a function of the user confidential information; and
    submitting the cipher C from the user computer to the server computer.

2. The method of claim 1 wherein
the parameter of the key is a key modulus.

3. The method of claim 1 wherein
the number e is an odd integer.

4. The method of claim 1
the cipher C is formed by the formula:

$$C = x_p^e \bmod n.$$

5. The method of claim 1 further comprising
using the user confidential information as a digital certificate of the user and digitally signing messages using a public key generated from the user confidential information.

6. The method of claim 5 wherein
the user confidential information is a user password.

7. The method of claim 1 wherein
the step of encrypting $x_p$ by using the parameter of the key and the number e to form a cipher C is implemented using a layer underlying communication between the user computer and the server computer.

8. The method of claim 7 wherein
the layer includes a web browser.

9. The method of claim 7 wherein
the layer includes a web page.

10. The method of claim 1 further comprising
decrypting messages from the server computer to the user computer using a public key generated from the user confidential information in order to secure information communicated both from the server computer to the user computer and from the user computer to the server computer.

11. The method of claim 1 wherein
the user confidential information is a user password.

12. The method of claim 1 further comprising
encrypting a message digest by using a public key generated from the user confidential information.

13. The method of claim 12 wherein
the user confidential information is a user password.

14. The method of claim 1 wherein
the set of information received from the server computer comprises a part of a public key used for encryption on the user computer.

15. The method of claim 1 wherein
the server computer is comprised of a plurality of computers.

16. The method of claim 1 further comprising
entering the user identification and the user confidential information in a single web page on the user computer;
submitting the user identification from the user computer to the server computer, without the user confidential information; and
subsequently receiving a further set of information at the user computer, from the server computer,
and wherein the step of submitting the cipher C from the user computer to the server computer is performed after the set of information is received at the user computer from the server computer.

17. The method of claim 1 further comprising
entering the user identification in a first web page on a user computer;
submitting the user identification from the user computer to the server computer, without the user confidential information;
subsequently receiving the set of information at the user computer, from the server computer;
entering the user confidential information in a second web page on the user computer after the set of information has been received at the user computer;
and wherein the step of submitting the cipher C from the user computer to the server computer is performed after the user confidential information is entered in the second web page of the user computer.

18. The method of claim 1 further comprising
receiving the user confidential information as a text entry into an authentication web page at the user computer prior to using the user computer to convert the user confidential information to the number x;
and wherein the user computer uses a text to number conversion scheme to convert the user confidential information to the number x.

19. The method of claim 18 wherein
the user confidential information is a user password.

* * * * *